United States Patent
Nishiwaki et al.

(10) Patent No.: US 8,144,210 B2
(45) Date of Patent: Mar. 27, 2012

(54) WHITE BALANCE ADJUSTMENT DEVICE AND WHITE BALANCE ADJUSTMENT METHOD

(75) Inventors: Katsuhiro Nishiwaki, Chita-gun (JP);
Hiroshi Nagatsuma, Nagoya (JP);
Yasuo Masui, Nishikamo-gun (JP);
Tadamasa Nakamura, Nagoya (JP)

(73) Assignee: Elmo Company, Limited (JP)

( * ) Notice: Subject to any disclaimer, the term of this patent is extended or adjusted under 35 U.S.C. 154(b) by 863 days.

(21) Appl. No.: 12/137,092

(22) Filed: Jun. 11, 2008

(65) Prior Publication Data
US 2008/0309790 A1 Dec. 18, 2008

(30) Foreign Application Priority Data
Jun. 12, 2007 (JP) ................ 2007-155189

(51) Int. Cl.
*H04N 9/73* (2006.01)
(52) U.S. Cl. .................................... 348/223.1
(58) Field of Classification Search .......... None
See application file for complete search history.

(56) References Cited

U.S. PATENT DOCUMENTS

| | | | | |
|---|---|---|---|---|
| 5,019,894 A | * | 5/1991 | Hieda et al. | 348/224.1 |
| 5,481,302 A | * | 1/1996 | Yamamoto et al. | 348/223.1 |
| 5,508,739 A | * | 4/1996 | Suh | 348/223.1 |
| 7,570,284 B2 | * | 8/2009 | Suzuki | 348/223.1 |

FOREIGN PATENT DOCUMENTS

| | | |
|---|---|---|
| JP | 7-255062 | 10/1995 |
| JP | 7-284118 | 10/1995 |
| JP | 11-75213 | 3/1999 |
| JP | 2001-36923 | 2/2001 |

* cited by examiner

*Primary Examiner* — Luong T Nguyen
(74) *Attorney, Agent, or Firm* — Ostrolenk Faber LLP

(57) ABSTRACT

To determine white balance convergence in a reliable manner, a white balance adjustment device for adjusting white balance of an input image supplied sequentially in time is provided. The white balance adjustment device comprises first and second integrating units. Each of the integrating units corrects a color component of a preceding input image based on mutually different correction parameter values. The integrating units respectively compute first and second integration values by integrating corrected color components. The first and second values to be used to correct the color component of a subsequent input image are determined by a correction parameter determining unit. The correction parameter determining unit changes the first and second values according to magnitude relationship between the first and second integration values and a benchmark value of the integration value. An image which has undergone the white balance adjustment is generated by correcting the color component of the image with a third value established between the first and second values.

8 Claims, 10 Drawing Sheets

Fig.1 FIRST EMBODIMENT

Fig.5 COMPARATIVE EXAMPLE (PRIOR ART)

Fig.8A FRAME

Fig.8B G INTEGRATION VALUE $I_G$

Fig.8C R INTEGRATION VALUE $I_R$

Fig.8D INTEGRATION VALUE DIFFERENTIAL $I_R - I_G$

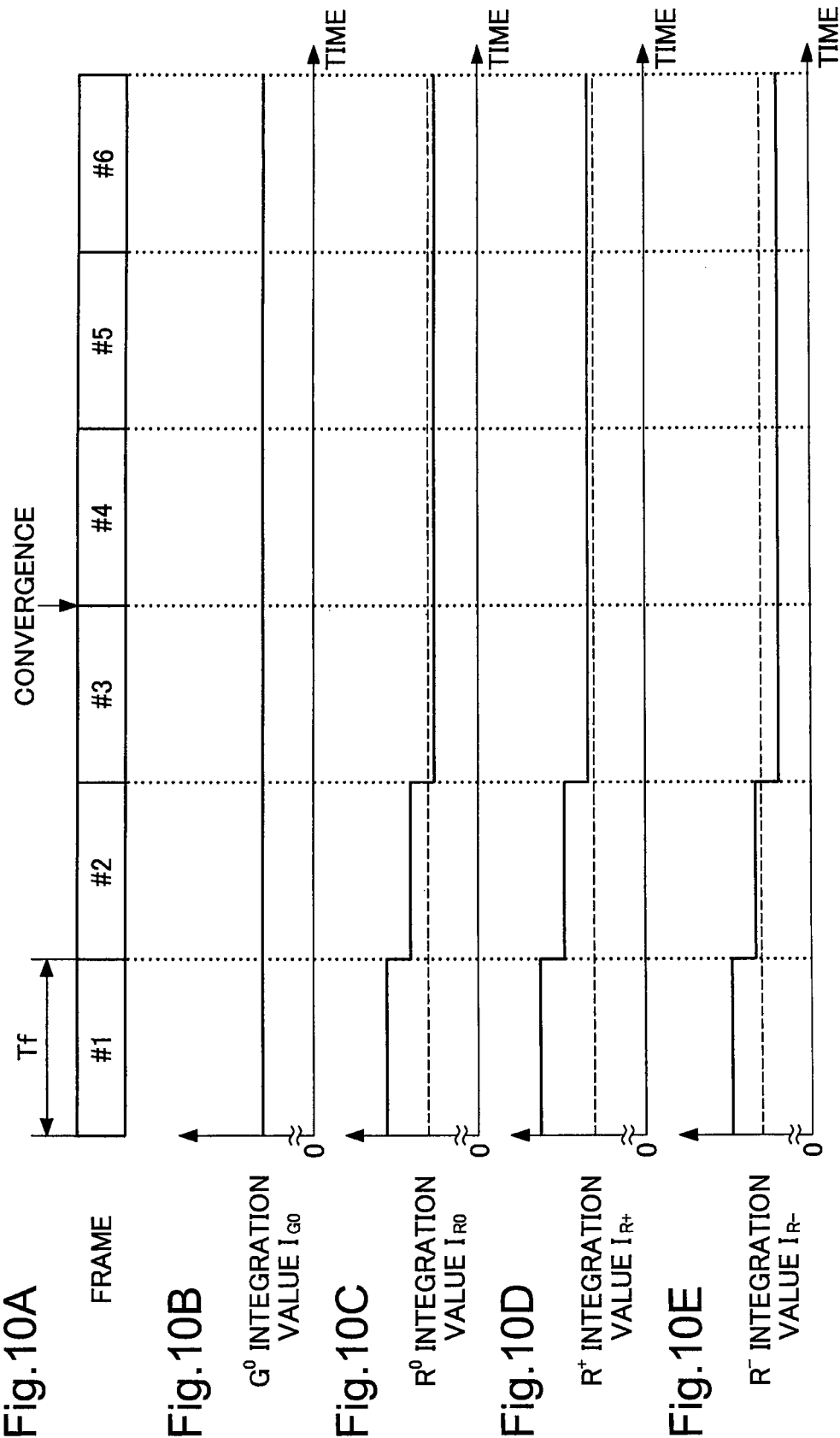

WHITE BALANCE ADJUSTMENT DEVICE AND WHITE BALANCE ADJUSTMENT METHOD

CROSS-REFERENCE TO RELATED APPLICATIONS

The present application claims the priority based on Japanese Patent Application No. 2007-155189 filed on Jun. 12, 2007, the disclosure of which is hereby incorporated herein by reference in its entirety.

BACKGROUND OF THE INVENTION

1. Field of the Invention

The present invention relates to a technique for white balance adjustment in a digital camera.

2. Description of the Related Art

In a digital camera such as a digital still camera or a video camera, the reproduced color for a given subject vary depending on differences in the spectrum of the light source. For this reason, white balance adjustment is performed so that the color of a white subject in a shot image may be reproduced as white. White balance adjustment typically involves adjusting gains of the red and blue image signals or of the image data on the basis of color component in the shot image. In such gain adjustment, respective cumulative values (integration values) of the red component, the blue component, and the green component of white pixels constituting the shot image are calculated, and setting of gains is carried out on the basis of the integration values so calculated. These integration values are dependent on gains and on the number of white pixels in the image as well. Accordingly, in order to carry out white balance adjustment in a manner irrespective of conditions of the shot image such as the number of white pixels, white balance adjustment is performed through repeated fine adjustment of gains based on color component in the gain-adjusted image.

However, completion of white balance adjustment (also termed "white balance convergence") is determined by comparing integration values of several color components (e.g. the red component and the green component) and detecting reversal of magnitude relationship of these integration values. For this reason, since color component integration values observed subsequent to fine gain adjustment are used for the determination of white balance convergence, there is a risk that, depending on conditions of the light source or the subject during shooting, determination of white balance convergence fails in some instances.

SUMMARY

An object of the present invention is to provide a technique for determining white balance convergence in a reliable manner.

According to an aspect of the present invention, a white balance adjustment device for adjusting white balance of an input image supplied sequentially in time is provided. The white balance adjustment device comprises: a first target color component integrating unit that corrects a target color component from among a plurality of color components in a prescribed color space of a preceding input image based on a first value of a correction parameter, and integrates the corrected target color component for an integration target area constituting at least a part of the preceding input image to calculate a first target color component integration value; a second target color component integrating unit that corrects the target color component of the preceding input image based on a second value different from the first value of the correction parameter, and integrates the corrected target color component for the integration target area to calculate a second target color component integration value; a correction parameter determining unit that determines the first and second values to be used to correct the target color component of a subsequent input image by changing the first and second values according to magnitude relationship of the first and second target color component integration values to a benchmark value of the target color component integration value; and an adjusted image generating unit that generates an adjusted image of which white balance is adjusted through correction of the target color component of the subsequent input image based on a third value established between the first and second values determined by the correction parameter determining unit.

With this arrangement, the correction parameter determining unit determines whether to change the first and second values according to magnitude relationship between the first and second component integration values computed with the preceding image and a benchmark value for target color component integration value. Accordingly, the determination as to whether to change the correction parameters, i.e. whether white balance has converged, may be made on the basis of the preceding image only, whereby white balance convergence may be determined in a more reliable manner.

The correction parameter determining unit may be configured not to change the first and second values in the case that the benchmark value lies between the first target color component integration value and the second target color component integration value, and to change the first and second values by performing addition or subtraction of a first offset value smaller than the differential between the first and second values to both of the first and second values used for correcting the target color component of the preceding input image according to magnitude relationship of the first and second target color component integration values to the benchmark value in the case that the benchmark value does not lie between the first target color component integration value and the second target color component integration value.

With this arrangement, the first and second values are changed by adding or subtracting a first offset value which is smaller than the difference between the first and second values. Thus, overadjustment of white balance may be prevented.

The white balance adjustment device may further comprises: a third target color component integrating unit that corrects the target color component of the preceding input image based on the third value, and integrates the corrected target color component for the integration target area to calculate a third target color component integration value, and the correction parameter determining unit may be configured to determine, on the basis of magnitude relationship of the third target color component integration value and the benchmark value, whether to add the first offset value to both of the first value and the second value, or to subtract the first offset value from both of the first value and the second value.

With this arrangement, the specifics of correction parameter changing is determined on the basis of the third value which is used for white balance adjustment in the adjusted image generating unit, thereby making it possible to adjust white balance to a more favorable condition.

The white balance adjustment device may be configured so that the target color component integration values monotonically increase as the correction parameter increases, the second value is set to a value greater than the first value, if the second target color component integration value is smaller than the benchmark value, the correction parameter determining unit further adds a second offset value established based on the differential of the first and second values respectively to the first and second values to which the first offset value has been added in advance, and if the second target color component integration value is greater than the benchmark value, the correction parameter determining unit further subtract the second offset value respectively from the first and second values from which the first offset value has been subtracted in advance.

With this arrangement, the first and second values of the correction parameter are further changed by a second offset value subsequent to changing by the first offset value. Accordingly, the changing amount of the correction parameter increases, and white balance may converge more quickly.

The benchmark value may be a comparative color component integration value derived by integrating a comparative color component different from the target color component of the preceding input image for the integration target area.

With this arrangement, a comparative color component integration value derived through integration of a comparative color component which is different from the target color component is used as the benchmark value for target color component integration value. For this reason, a benchmark value specific to the input image can be established, thereby making it possible to adjust white balance to a more favorable condition.

The white balance adjustment device may be configured so that the input image supplied sequential in time is a moving image, the subsequent input image is an image of a current frame of which output from the white balance adjustment device is in progress, and the preceding input image is an image of a frame just previous to the current frame.

The present invention can be reduced to practice in various modes. Examples of such modes are a white balance adjustment device and white balance adjustment method; a video camera and digital still camera implementing such a white balance adjustment device and white balance adjustment method; a control device and control method for a video camera and a digital still camera; a computer program for achieving such a device and method; a recording medium having such a computer program recorded thereon; or a data signal containing such a computer program and embodied in a carrier wave.

These and other objects, features, aspects, and advantages of the present invention will become more apparent from the following detailed description of the preferred embodiments with the accompanying drawings.

BRIEF DESCRIPTION OF THE DRAWINGS

FIGS. 10A through 10E are illustrations depicting white balance adjustment taking place in the second embodiment.

DESCRIPTION OF THE PREFERRED EMBODIMENT

A. First Embodiment

Figure 1:
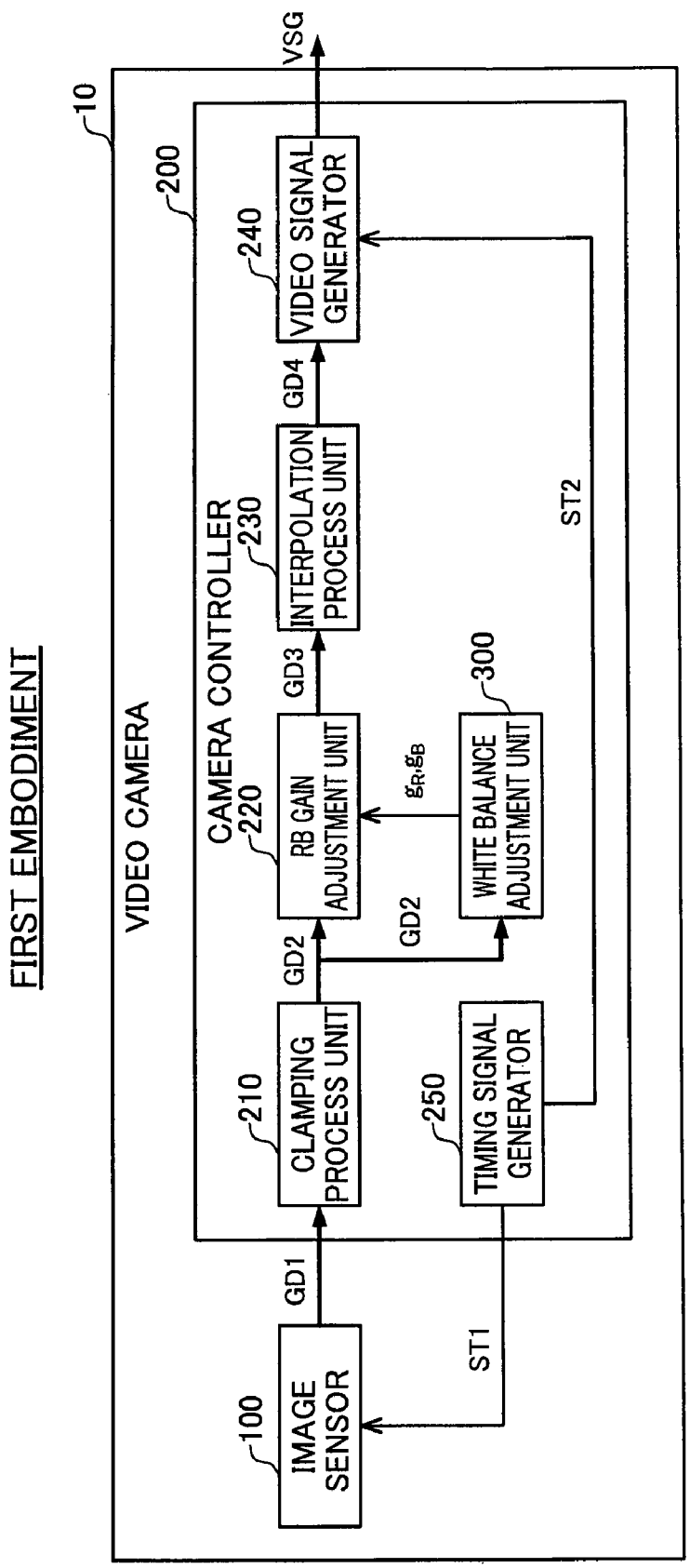
FIG. 1 is a functional block diagram showing the functional configuration of a video camera as a first embodiment.

A1. Configuration of Video Camera:

FIG. 1 is a functional block diagram showing the functional configuration of a video camera 10 as a first embodiment. The video camera 10 has an image sensor 100 and a camera controller 200. The camera controller 200 controls the image sensor 100 and carries out various processes on image data GD1 supplied from the image sensor 100 so as to generate a video signal VSG outputted from the video camera 10.

The image sensor 100 generates the image data GD1 representing a subject image formed onto a photo acceptance portion by a lens (not shown). The generated image data GD1 is supplied to a clamping process unit 210. In the video camera 10, image data GD1 of a single frame is generated periodically in response to a periodic timing signal ST1 supplied from a timing signal generator 250, and the generated data is supplied to the clamping process unit 210. As the image sensor it is possible to employ, for example, a CMOS image sensor in which an amplifier and an analog-digital converter (A/D converter) are embedded, or a CCD image sensor equipped with an amplifier and an A/D converter (hereinafter collectively referred to as an "analog front end").

The photo acceptance portion of the image sensor 100 is composed of a plurality of sensor elements. The sensor elements generate an electrical charge in response to incident light, and accumulate the charge generated during intervals specified by the timing signal ST1. Filters of the primary colors RGB are disposed in a checkerboard arrangement (termed as the "Bayer Arrangement") on the sensor elements, and the charge corresponding to the intensity of incident light of one of the colors R, G, or B accumulates in each sensor element. An electrical signal (image signal) representing accumulated charge amount in each of sensor elements is amplified, and the amplified image signal is converted to digital data by the A/D converter to generate the image data GD1. Accordingly, each of the pixels of the image data GD1 corresponding to the sensor elements has a color component of one of the colors R, G, or B. Such image data GD1 whose pixels each have only one color component of one of the colors R, G, or B is also referred to as "Bayer data."

The clamping process unit 210 performs a clamping process on the image data GD1 to generate image data GD2. Here, the clamping process means a process of converting values (black values) which represent black (optical black) in the image data GD1 to black values for use in various processes taking place in the camera controller 200. The image data GD2 having undergone the clamping process is supplied to an RB gain adjustment unit 220 and a white balance adjustment unit 300.

On the basis of the image data GD2, the white balance adjustment unit 300 determines a red gain setting value $g_R$ and a blue gain setting value $g_B$ to be supplied to the RB gain adjustment unit 220. The specific configuration of the white balance adjustment unit 300, and the specific method for determining these gain setting values $g_R$, $g_B$ will be discussed later.

The RB gain adjustment unit 220 adjusts gains of red component value and blue component value on the basis of the red gain setting value $g_R$ and the blue gain setting value $g_B$ which are provided from the white balance adjustment unit 300. Specifically, the red gain setting value $g_R$ is multiplied to red component values of the image data GD2, and the blue gain setting value $g_B$ is multiplied to blue component values. Green component values do not undergo gain adjustment and are output unchanged. In this way, the RB gain adjustment unit 220 generates image data GD3 in which red component values and blue component values have undergone gain adjustment. The image data GD3 generated by the RB gain adjustment unit 220 is supplied to an interpolation process unit 230. From the preceding discussion it will be understood that gain is a "correction parameter" for the purpose of correcting the red color component R or blue color component B in the RGB color space.

The interpolation process unit 230 generates the missing color component values for each pixel of the image data GD3. Specifically, for each pixel of the image data GD3, the missing color component values of the pixel are generated through interpolation from color component values of neighboring pixels. This process affords interpolated image data GD4 composed of image data each of whose pixels has color component values for all three colors.

In response to a timing signal ST2 supplied from a timing signal generator, a video signal generator 240 generates the video signal VSG from the image data GD4 provided from the interpolation process unit 230. In the video signal generator 240, the image data GD4 is subjected to various processes such as gamma correction, color conversion, edge enhancement, and so on. The video signal VSG of prescribed format is then generated from the image data which has undergone these processes. Since the processes carried out in the video signal generator 240 have no practical impact on the present invention they will not be discussed here.

Figure 2:
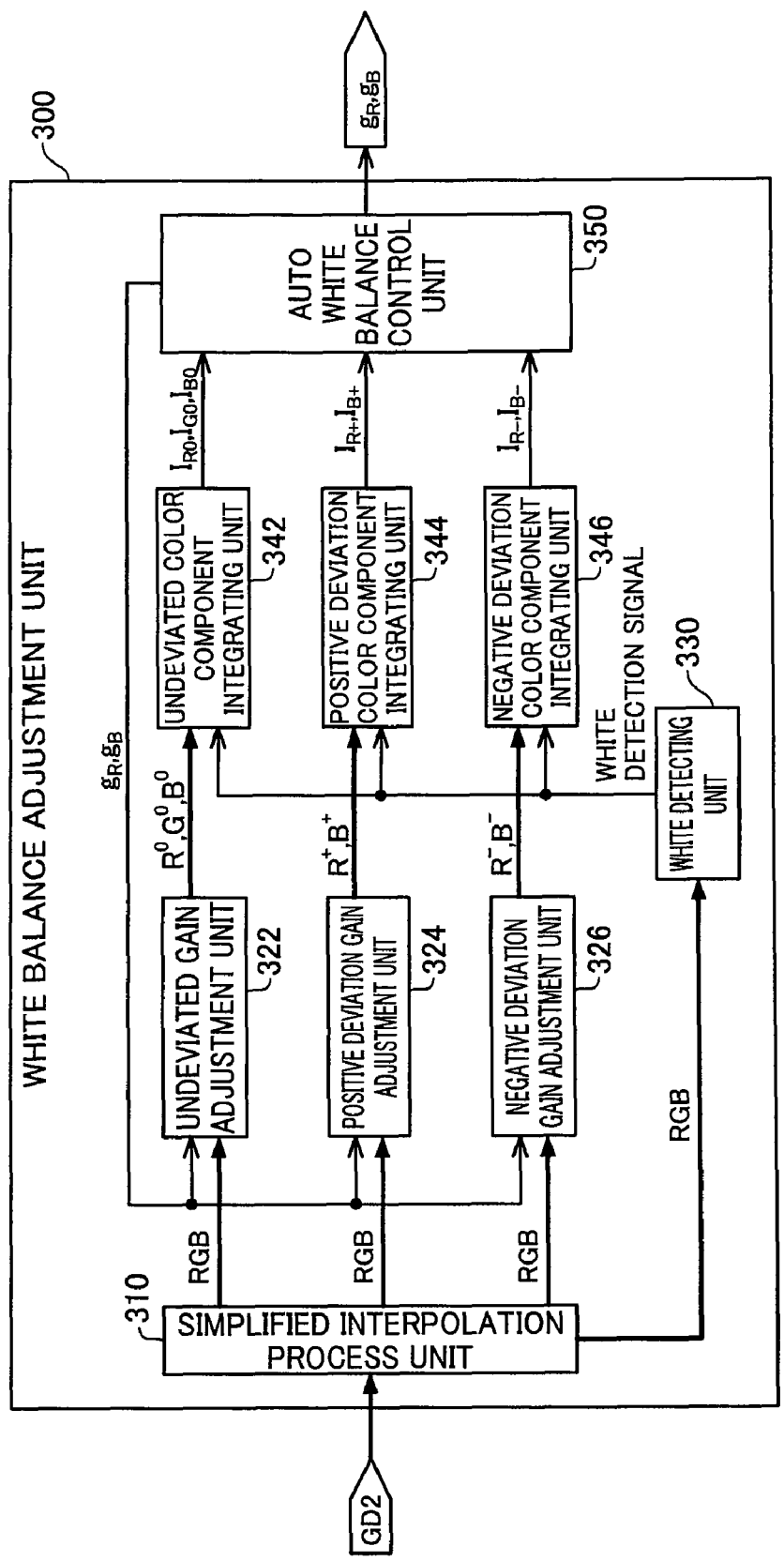
FIG. 2 is a functional block diagram showing the functional configuration of the white balance adjustment unit.

FIG. 2 is a functional block diagram showing the functional configuration of the white balance adjustment unit 300. The white balance adjustment unit 300 includes a simplified interpolation process unit 310, an undeviated gain adjustment unit 322, a positive deviation gain adjustment unit 324, a negative deviation gain adjustment unit 326, an undeviated color component integrating unit 342, a positive deviation color component integrating unit 344, a negative deviation color component integrating unit 346, a white detecting unit 330, and an auto white balance (AWB) control unit. Hereinafter, the undeviated gain adjustment unit adjustment unit 322, the positive deviation gain adjustment unit 324, and the negative deviation gain adjustment unit 326 will also be referred to collectively as "gain adjustment units." Similarly, the undeviated color component integrating unit 342, the positive deviation color component integrating unit 344, and the negative deviation color component integrating unit 346 will also be referred to collectively as "color component integrating units."

The simplified interpolation process unit 310 interpolates and generates color component values missing from the pixels of the image data GD2 by carrying out an interpolation process on the image data GD2. Since the image data generated by the simplified interpolation process unit 310 is used only for adjusting the white balance, an interpolation process simpler than the normal interpolation process which is performed by the interpolation process unit 230 is carried out. The simplified interpolation process unit 310 generates the missing color component values, for example, by averaging the color component values of pixels neighboring the pixel currently targeted for generating color component values.

The RGB image data having undergone the simplified interpolation process is supplied to the three gain adjustment unit 322 through 326 and to the white detecting unit 330. The white detecting unit 330 determines whether each pixel constituting the image is a pixel that represents white color (a white pixel). Specifically, a pixel of interest is determined to be a white pixel in the event that any of the R, G, and B color components of the pixel of interest is higher than a prescribed threshold value. If the pixel of interest is determined to be a white pixel, the white detecting unit 330 supplies a white detection signal to the three color component integrating units 342 through 346.

The undeviated gain adjustment unit 322 adjusts gain of the red component values and the blue component values by gain specified by the red gain setting value $g_R$ and the blue gain setting value $g_B$. Specifically, in the same manner as the RB gain adjustment unit 220, the red component values R are multiplied by the red gain setting value $g_R$ in order to output gain-adjusted red component values $R^0$, and the blue component values are multiplied by the blue gain setting value $g_B$ in order to output gain-adjusted blue component values $B^0$. Green component values do not undergo gain adjustment, and green component values $G^0$ (=G) is output unchanged.

The positive deviation gain adjustment unit adjustment unit 324 adjusts gains of the red component values and the blue component values by gain equivalent to a prescribed deviation A (>0) which is added respectively to the red gain setting value $g_R$ and the blue gain setting value $g_B$ (hereinafter the adjusted gain is termed "positive deviation gain"). Specifically, the red component values R are multiplied by the red positive deviation gain ($g_R$+A) in order to output gain-adjusted red component values $R^+$, and the blue component values are multiplied by the blue positive deviation gain ($g_B$+A) in order to output gain-adjusted blue component values $B^+$. In the present embodiment, a unit gain adjustment value (1) is employed as the deviation A, but it is possible to use a twice (2) or greater value of the unit gain adjustment value as the deviation A. However, it is preferable to set the prescribed deviation A to 1 in term of the ability to suppress fluctuations in white balance. On the other hand, where for example the image signal is highly amplified in the image sensor and the S/N ratio of the image data has declined, it is preferable to use a value of 2 or greater for deviation A. By increasing the value of deviation A, execution of unnecessarily white balance adjustment may be prevented.

The negative deviation gain adjustment unit 326 adjusts gains of the red component values and the blue component values by gain equivalent to the aforementioned deviation A subtracted respectively from the red gain setting value $g_R$ and from the blue gain setting value $g_B$ (hereinafter the adjusted gain is termed "negative deviation gain"). Specifically, the red component values R are multiplied by the red negative deviation gain ($g_R$−A) in order to output gain-adjusted red component values $R^-$, and the blue component values are multiplied by the blue negative deviation gain ($g_B$−A) in order to output gain-adjusted blue component values $B^-$.

In the first embodiment, the positive deviation gain and the negative deviation gain are derived by adding/subtracting the deviation A to/from the gain setting values $g_R$, $g_B$. It can also be said that the gain setting values are derived from the positive deviation gain and the negative deviation gain. In general, gain setting values may be set a value lying between the positive deviation gain and the negative deviation gain.

For pixels which the white detecting unit 330 has determined to be pixels of white color (white pixels), the undeviated color component integrating unit 342 integrates the red component values $R^0$, the blue component values $B^0$, and the green component values $G^0$ which are output from the undeviated gain adjustment unit adjustment unit 322. An integration value $I_{R0}$ of the red component values $R^0$ (undeviated red component integration value), an integration value $I_{B0}$ of the blue component values $B^0$ (undeviated blue component integration value), and an integration value $I_{G0}$ of the green component values $G^0$ (undeviated green component integration value) are supplied to the auto white balance control unit 350.

For white pixels, the positive deviation color component integrating unit 344 integrates the red component values $R^+$ and blue component values $B^+$ which are output from the positive deviation gain adjustment unit 324. An integration value $I_{R+}$ of the red component values $R^+$ (positive deviation red component integration value) and an integration value $I_{B+}$ of the blue component values $B^+$ (positive deviation blue component integration value) are supplied to the auto white balance control unit 350.

For white pixels, the negative deviation color component integrating unit 346 integrates the red component values $R^-$ and blue component values $B^-$ which are output from the negative deviation gain adjustment unit 326. An integration value $I_{R-}$ of the red component values $R^-$ (negative deviation red component integration value) and an integration value $I_{B-}$ of the blue component values $B^-$ (negative deviation blue component integration value) are supplied to the auto white balance control unit 350.

On the basis of the color component integration values $I_{R0}$, $I_{B0}$, $I_{G0}$, $I_{R+}$, $I_{B+}$, $I_{R-}$, $I_{B-}$ supplied respectively from the three color component integrating units 342 through 346, the auto white balance control unit 350 determines the red gain setting value $g_R$ and the blue gain setting value $g_B$. The gain setting values $g_R$, $g_B$ so determined are supplied to the three gain adjustment units 322 through 326, and to the RB gain adjustment unit 220 (FIG. 1).

Figure 3:
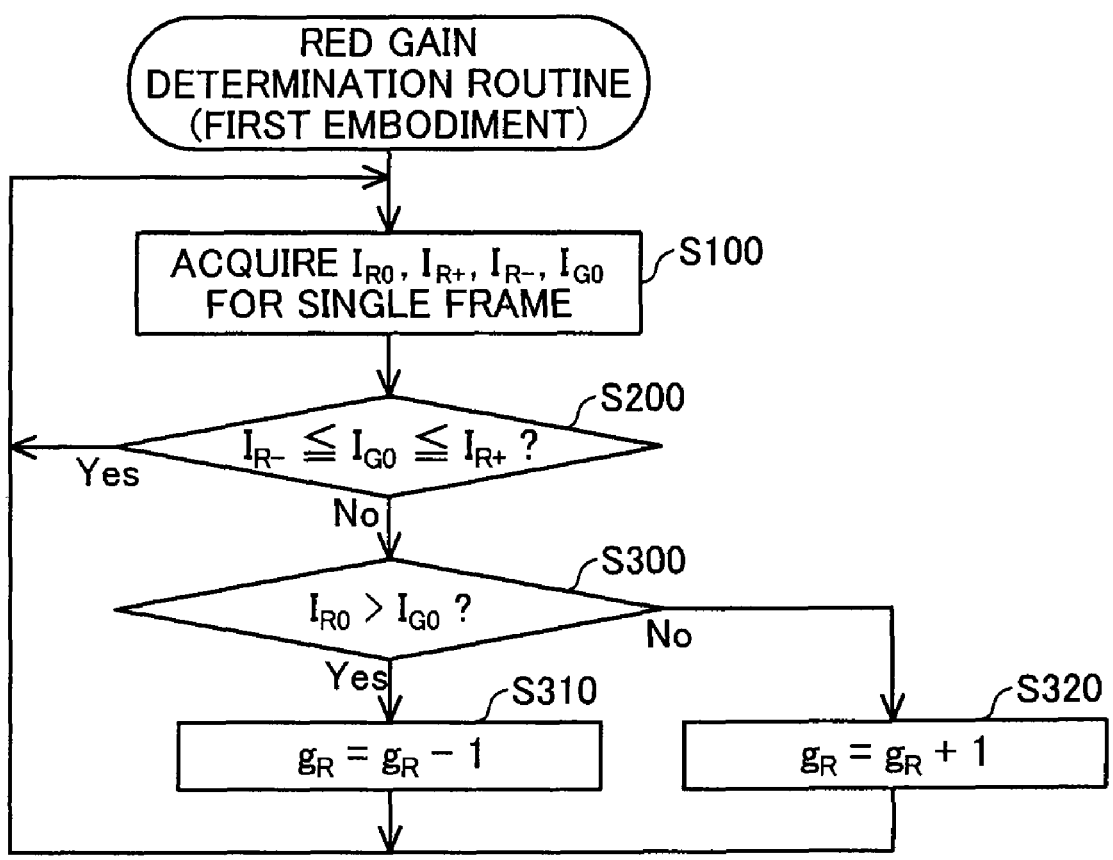
FIG. 3 is a flowchart showing a red gain determination routine which is executed by the auto white balance control unit.

A2. White Balance Adjustment:

FIG. 3 is a flowchart showing a red gain determination routine which is executed by the auto white balance control unit 350. In the red gain determination routine, the red gain setting value $g_R$ is determined on the basis of the green component integration value $I_{G0}$ and the three kinds of red color component integration values $I_{R0}$, $I_{R+}$, $I_{R-}$. While FIG. 3 depicts the red gain determination routine for determining the red gain setting value $g_R$, the blue gain setting value $g_B$ is determined analogously on the basis of the green component integration value $I_{G0}$ and the three kinds of blue color component integration values $I_{B0}$, $I_{B+}$, $I_{B-}$.

Figure 4:
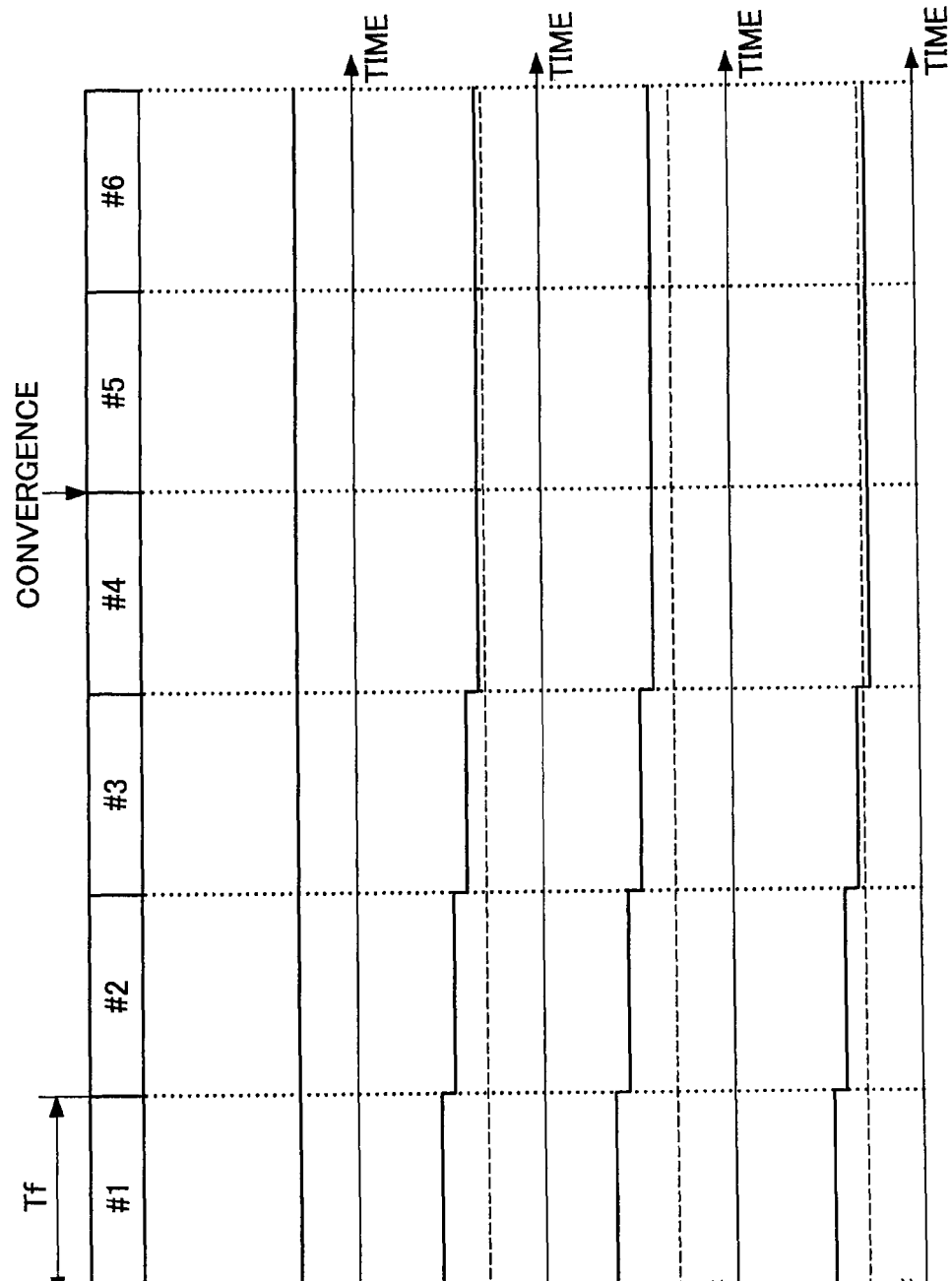
FIGS. 4A through 4E are illustrations depicting white balance adjustment taking place in the first embodiment.

FIGS. 4A through 4E are illustrations depicting white balance adjustment taking place through execution of the red gain determination routine of FIG. 3. Each of the graph in FIGS. 4B through 4E shows change over time in the green component integration value $I_{G0}$ and the three kinds of red color component integration values $I_{R0}$, $I_{R+}$, $I_{R-}$ respectively. In FIGS. 4A through 4E, horizontal axis represents time. FIG. 4A shows the frame numbers of the image data. In FIGS. 4B through 4E, vertical axis represents the magnitude of the respective color component integration value. The broken lines in FIGS. 4C through 4E show the green component integration value $I_{G0}$. In FIGS. 4B through 4E, the color component integration values $I_{G0}$, $I_{R0}$, $I_{R+}$, $I_{R-}$ for single frame increments are shown as a graph in which their values are unchanged over each frame interval Tf. The color component integration values $I_{G0}$, $I_{R0}$, $I_{R+}$, $I_{R-}$ are computed at specific timing between the start of the frame and the end of frame interval Tf. The example of FIGS. 4A through 4E shows a condition in which the same given subject is shot. Accordingly, the number of white pixels in the shot image does not change, and the green component integration value $I_{G0}$ does not change over time.

In Step S100, the auto white balance control unit 350 acquires the green component integration value $I_{G0}$ and the three kinds of red color component integration values $I_{R0}$, $I_{R+}$, $I_{R-}$ for single frame increments. Specifically, the auto white balance control unit 350 acquires the color component integration values $I_{R0}$, $I_{R+}$, $I_{R-}$ for a single frame from the three color component integration units 342 through 346, at the timing when the color component integration units 342 through 346 complete calculation of these color component integration values $I_{R0}$, $I_{R+}$, $I_{R-}$.

In Step S200, the auto white balance control unit 350 determines whether the green component integration value $I_{G0}$ lies within a range between the negative deviation red component integration value $I_{R-}$ and the positive red component integration value $I_{R+}$ (convergence range), that is, whether gain adjustment is needed. In the event of a determination that the green component integration value $I_{G0}$ lies within the convergence range, control returns to Step S100. On the other hand, in the event of a determination that the green component integration value $I_{G0}$ lies outside the convergence range, control passes to Step S300. In the example of FIGS. 4A through 4E, during the first frame interval (Frame #1), the green component integration value $I_{G0}$ is smaller than the negative deviation red component integration value $I_{R-}$ (and the positive red component integration value $I_{R+}$). Therefore, it is determined that the green component integration value $I_{G0}$ lies outside the convergence range, and control passes to Step S300.

In Step S300 of FIG. 3, the auto white balance control unit 350 determines whether the red component integration value $I_{R0}$ is greater than the green component integration value $I_{G0}$. In the event of a determination that the red component integration value $I_{R0}$ is greater than the green component integration value $I_{G0}$, control passes to Step S310. In Step S310, the red gain setting value $g_R$ is decremented by a prescribed offset value "1", and after the red gain setting value $g_R$ is reduced, control returns to Step S100. On the other hand, in the event of a determination that the red component integration value $I_{R0}$ is smaller than the green component integration value $I_{G0}$, control passes to Step S320. In Step S320, the red gain setting value $g_R$ is incremented by a prescribed offset value "1", and after increase of the red gain setting value $g_R$, control returns to Step S100. In the example of FIGS. 4A through 4E, during the first frame interval, the red component integration value $I_{R0}$ is greater than the green component integration value $I_{G0}$. Therefore, control passes from Step S300 to Step S310, and the red gain setting value $g_R$ is reduced by "1." In the first embodiment, the red gain setting value $g_R$ is incremented or decremented by an offset value of 1 (the gain adjustment unit) in Steps S310 and S320. As the offset value to be incremented and/or decremented, a value besides 1 may also be used. In this case, it is preferable to use smaller value than the difference between the negative deviation gain and the positive deviation gain (2×A) as the offset value in order to avoid overadjustment of white balance.

As shown in FIGS. 4A through 4E, owing to the reduction in the red gain setting value $g_R$ by "1" on the basis of the color component integration values $I_{G0}$, $I_{R0}$, $I_{R+}$, $I_{R-}$ of the first frame interval, in the second frame interval (Frame #2) the red component integration values $I_{R0}$, $I_{R+}$, $I_{R-}$ becomes smaller than their respective values in the first frame interval. However, since in the second frame interval as well, the green component integration value $I_{G0}$ lies outside the convergence range and the red component integration value $I_{R0}$ is greater than the green component integration value $I_{G0}$, the red gain setting value $g_R$ is further decremented by "1."

Owing to this reduction in the red gain setting value $g_R$ by "1," in the third frame interval (Frame #3) the red component integration values $I_{R0}$, $I_{R+}$, $I_{R-}$ becomes smaller than their respective values in the second frame interval. However, since in the third frame interval as well, the green component integration value $I_{G0}$ lies outside the convergence range and the red component integration value $I_{R0}$ is greater than the green component integration value $I_{G0}$, the red gain setting value $g_R$ is further decremented by "1."

In the fourth frame interval (Frame #4), the green component integration value $I_{G0}$ now lies inside the convergence range owing to the reduction in the red gain setting value $g_R$ by "1." This condition whereby the green component integration value $I_{G0}$ lies inside the convergence range is also referred to as a "condition of white balance convergence," and the green component integration value $I_{G0}$ lying within the convergence range is also called "convergence of white balance." From the preceding discussion it will be appreciated that the green component integration value $I_{G0}$ is the benchmark value of the red component integration value $I_{R0}$.

Figure 5:
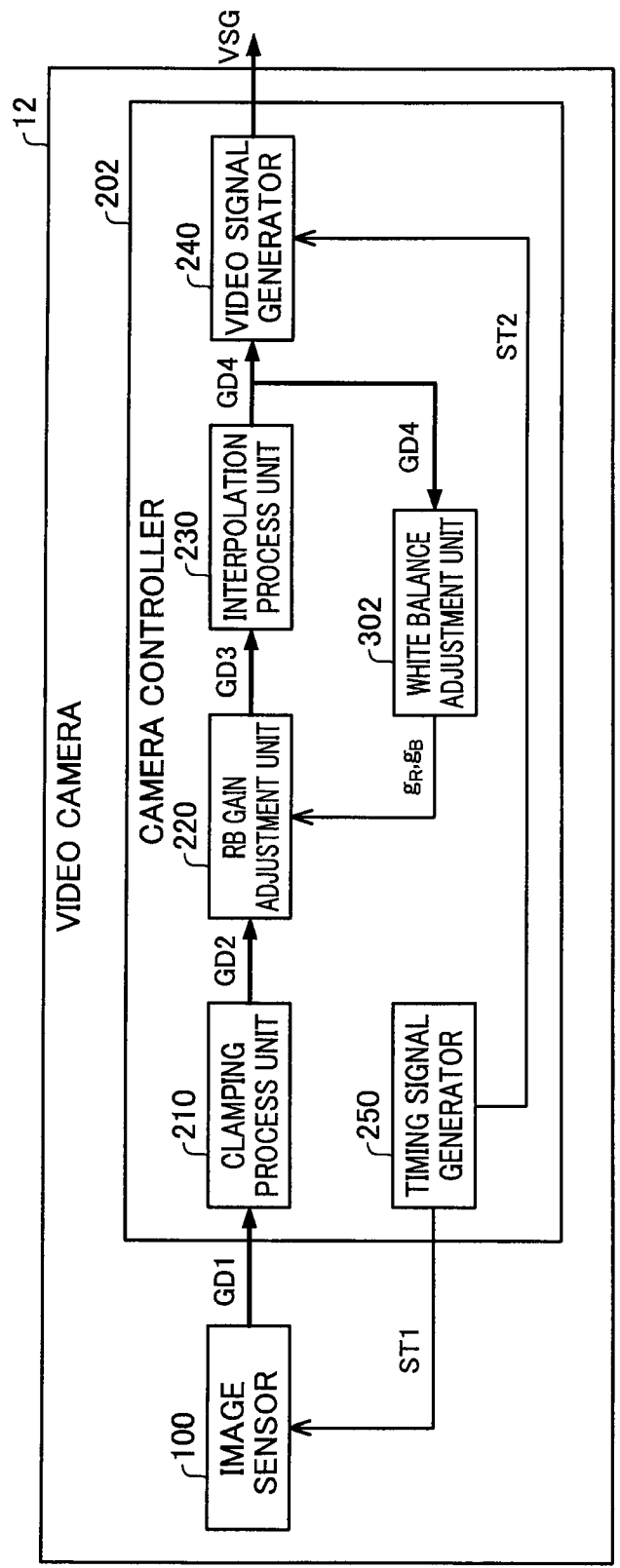
FIG. 5 is a functional block diagram showing the functional configuration of a conventional video camera as a comparative example.

A3. Prior Art as a Comparative Example:

FIG. 5 is a functional block diagram showing the functional configuration of a conventional video camera as a comparative example. The video camera 12 of the comparative example differs from the video camera 10 of the first embodiment shown in FIG. 1 in that the image data supplied to a white balance adjustment unit 302 is changed to the image data GD4 which is output from the interpolation process unit 230. Other respects are similar to the first embodiment.

Figure 6:
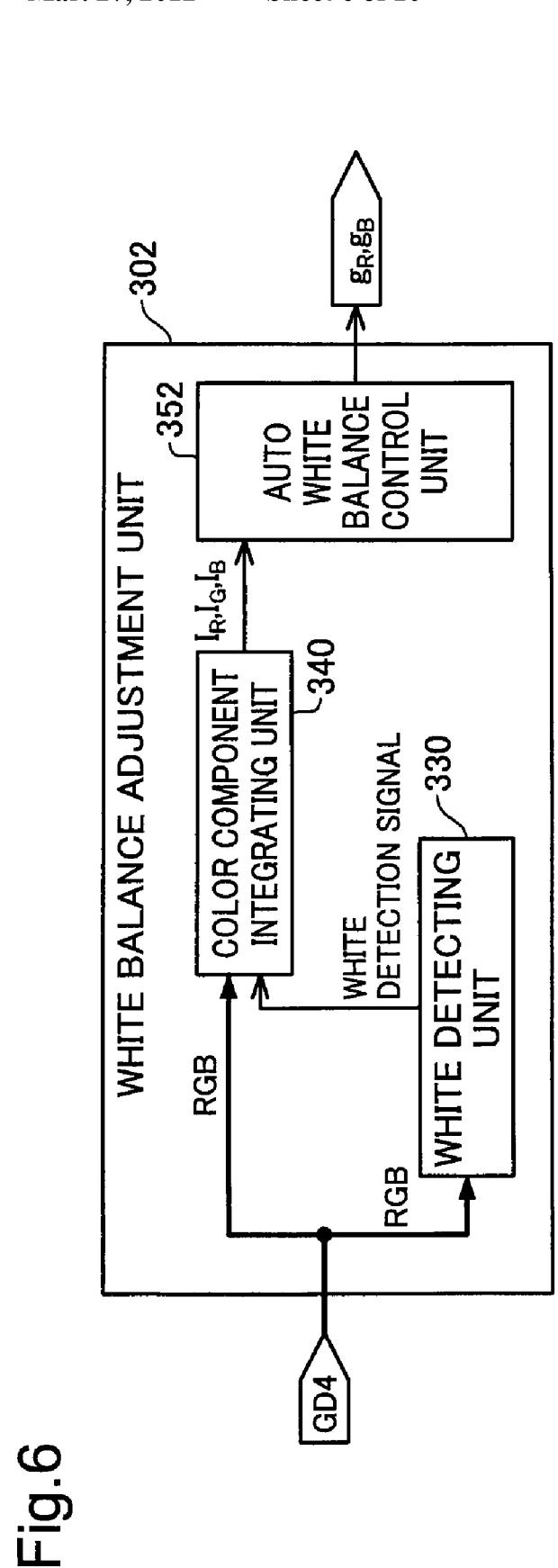
FIG. 6 is a functional block diagram showing the functional configuration of the white balance adjustment unit in the comparative example.

FIG. 6 is a functional block diagram showing the functional configuration of the white balance adjustment unit 302 in the comparative example. The white balance adjustment unit 302 of the comparative example differs from the white balance adjustment unit 300 of the first embodiment in that the simplified interpolation process unit 310 and the gain adjustment units 322 through 326 are omitted, and a single color component integrating unit 340 is used in place of the three color component integrating units 342 through 346. Other respects are similar to the first embodiment.

Similar to the white balance adjustment unit of the first embodiment, the white detecting unit 330 determines whether each pixel constituting the image data GD4 represents white color. If a pixel of interest is determined to be a white pixel, a white detection signal is supplied to the color component integrating unit 340.

For white pixels of the image data GD4, the color component integrating unit 340 integrates each of the color component values R, G, and B in order to generate color component integration values $I_R$, $I_G$, $I_B$. The generated color component integration values $I_R$, $I_G$, $I_B$ is supplied to an auto white balance control unit 352. On the basis of the supplied color component integration values $I_R$, $I_G$, $I_B$, the auto white balance control unit 352 determines a red gain setting value $g_R$ and a blue gain setting value $g_B$. The gain setting values $g_R$, $g_B$ so determined are supplied to the RB gain adjustment unit 220 (FIG. 5). The RB gain adjustment unit 220 adjusts the white balance of the image data GD3, GD4 by adjusting gain of red component values and blue component values on the basis of the gain setting values $g_R$, $g_B$. Through adjustment of the white balance of the image data GD4 in this way, feedback control of white balance adjustment is carried out.

Figure 7:
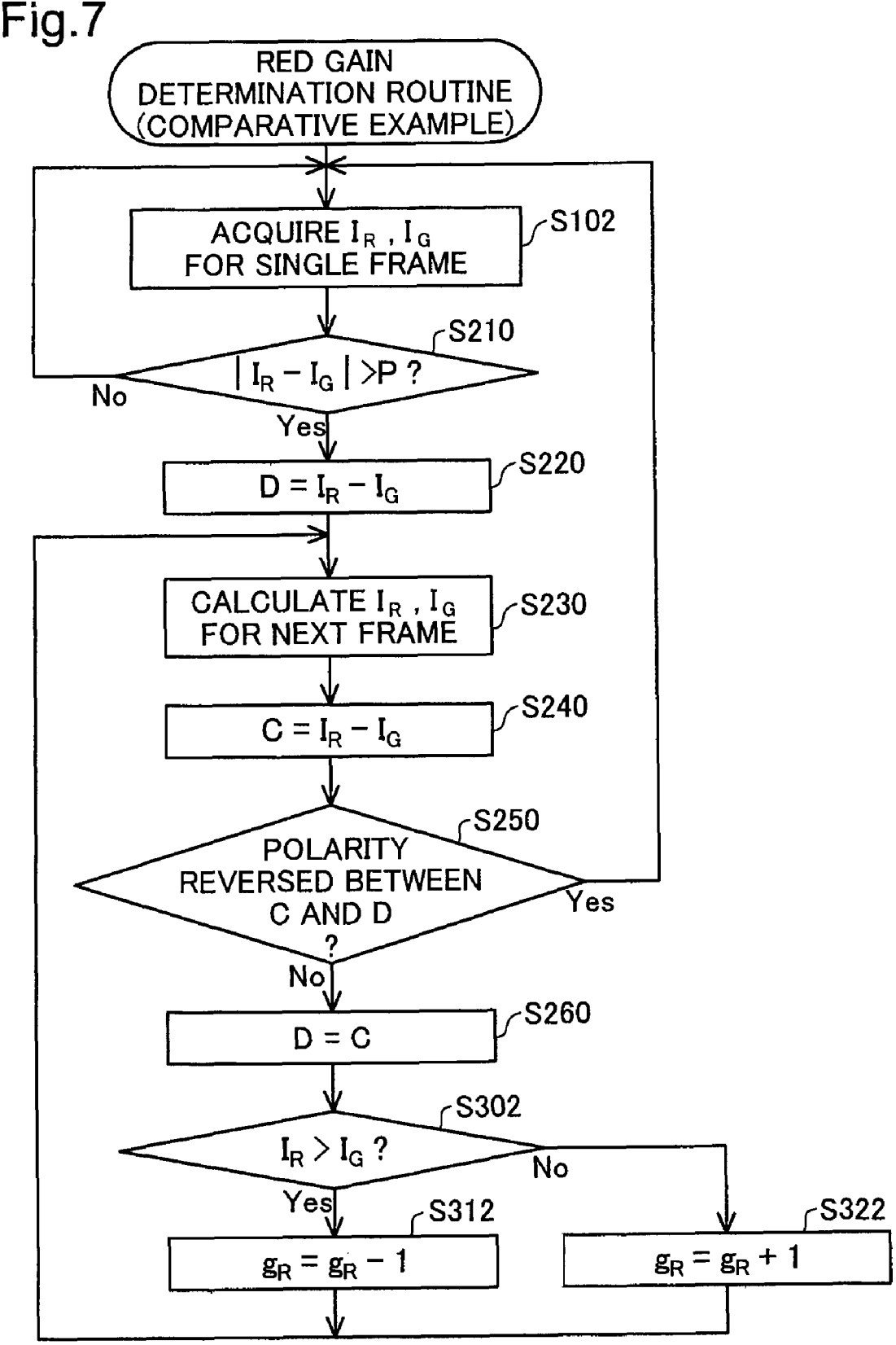
FIG. 7 is a flowchart showing a red gain determination routine which is executed by the auto white balance control unit of the comparative example.

FIG. 7 is a flowchart showing a red gain determination routine which is executed by the auto white balance control unit 352 of the comparative example. The red gain determination routine of FIG. 7 differs from the red gain determination routine of the first embodiment shown in FIG. 3 in that Step S100 is replaced by Step S102, Step S200 is replaced by Steps S210 to S260, and Steps 300 through S320 are replaced by Steps S302 through S322 respectively.

FIGS. 8A through 8D are illustrations depicting white balance adjustment taking place through execution of the red gain determination routine of FIG. 7. Each graph in FIGS. 8B through 8D show change over time in the green component integration value $I_G$, the red component integration value $I_R$, and the difference between these component integration values (integration value differential) $I_R - I_G$. In FIGS. 8A through 8D, the horizontal axis represents time. FIG. 8A shows the frame numbers of the image data. In FIGS. 8B and 8C, the vertical axis represents the magnitude of the respective color component integration value.

In Step S102, the auto white balance control unit 352 acquires the green component integration value $I_G$ and the red color component integration value $I_R$ for single frame increments from the color component integrating unit 340. Specifically, the auto white balance control unit 352 acquires the color component integration values $I_G$, $I_R$ for a single frame from the color component integrating unit 340, at the timing when the color component integrating unit 340 completes calculation of these color component integration values $I_G$, $I_R$.

In Step S210, the auto white balance control unit 352 determines whether the absolute value of the difference between the red color component integration value $I_R$ and the green component integration value $I_G$ (absolute integration value differential) $|I_R - I_G|$ is greater than an adjustment initiation parameter P. If it is determined that the absolute integration value differential $|I_R - I_G|$ is smaller than the adjustment initiation parameter P, i.e. determined that white balance adjustment is not needed, control returns to Step S102, and Steps S102 and S210 are executed repeatedly until it is determined that white balance adjustment is needed. If on the other hand it is determined that the absolute integration value differential $|I_R - I_G|$ is greater than the adjustment initiation parameter P, i.e. determined that white balance adjustment is needed, control passes to Step S220, and white balance adjustment is initiated.

When white balance adjustment is initiated, in Step S220, the auto white balance control unit 352 sets the integration value differential $I_R - I_G$ to the preceding frame integration value differential D. In the example of FIGS. 8A through 8D, the integration value differential $I_R - I_G$ of the first frame (Frame #1) is set to the preceding frame integration value differential D.

In Step S230, the auto white balance control unit 352 acquires the green component integration value $I_G$ and the red color component integration value $I_R$ of the next frame. Specifically, the auto white balance control unit 352 acquires the color component integration values $I_G$, $I_R$ of the next frame from the color component integrating unit 340, at the timing when the color component integrating unit 340 completes calculation of these color component integration values $I_G$, $I_R$. In the example of FIGS. 8A through 8D, after the color component integration values $I_G$, $I_R$ are calculated at specific timing during the interval of the second frame (Frame #2), the computed component integration values $I_G$, $I_R$ are acquired.

In Step S240, the auto white balance control unit 352 assigns the integration value differential $I_R-I_G$ acquired in Step S240 to the current frame integration value differential C. In the example of FIGS. 8A through 8D, the integration value differential $I_R-I_G$ of the second frame is set to the current frame integration value differential C.

In Step S250, the auto white balance control unit 352 determines whether polarity reverses between the preceding frame integration value differential D and the current frame integration value differential C. If it is determined that the polarity reverses, i.e. that white balance converges, control passes to Step S102. If on the other hand it is determined that the polarity does not reverse, i.e. that white balance does not converges, control passes to Step S260. Next, in Step S260, the current frame integration value differential C is set to the preceding frame integration value differential D.

In Step S302, the auto white balance control unit 352 determines whether the red component integration value $I_R$ is greater than the green component integration value $I_G$. In the event of a determination that the red component integration value $I_R$ is greater than the green component integration value $I_G$, control passes to Step S312, and the red gain setting value $g_R$ is decremented by "1." If on the other hand, it is determined that the red component integration value $I_R$ is smaller than the green component integration value $I_G$, control passes to Step S322, and the red gain setting value $g_R$ is incremented by "1."

After modification of the red component integration value $I_R$, control returns to Step S230, and Steps S230 through S322 are executed repeatedly until it is determined in Step S250 that white balance converges.

Figure 8:
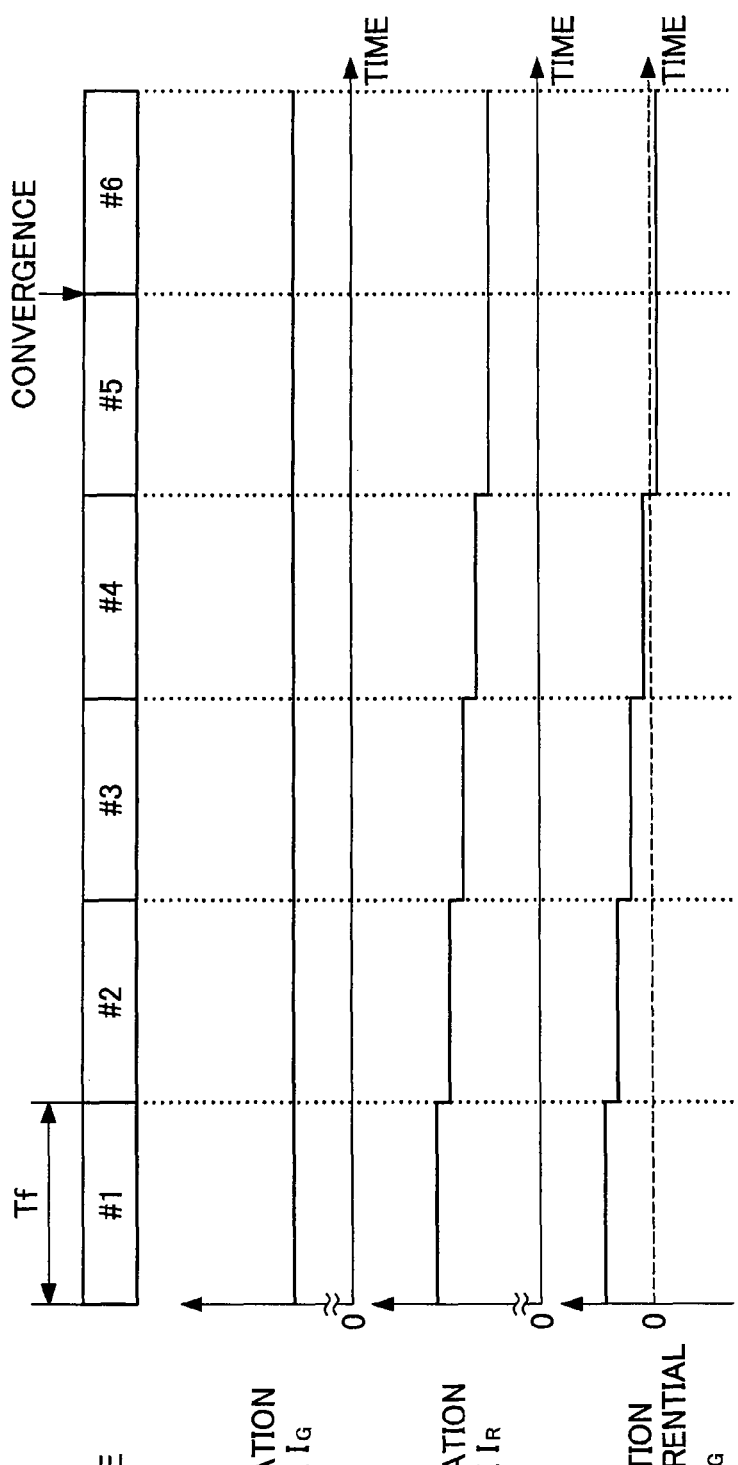
FIGS. 8A through 8D are illustrations depicting white balance adjustment taking place in the comparative example.

In the example of FIG. 8, during the second frame interval, the integration value differential $I_R-I_G$ is a positive value from the first frame to the fourth frame (Frame #4). In the fifth frame (Frame #5), the integration value differential $I_R-I_G$ becomes a negative value. Accordingly, it is determined that white balance converges in the fifth frame.

In contrast to this, with the first embodiment, it is determined that white balance converges in the fourth frame, as shown in FIGS. 4A through 4E. According to the first embodiment, by determining the red gain setting value $g_R$ and the blue gain setting value $g_B$ on the basis of the undeviated component integration values $I_{R0}, I_{G0}, I_{B0}$, the positive deviation component integration values $I_{R+}, I_{B+}$, and the negative deviation component integration values $I_{R-}, I_{B-}$ in this way, white balance convergence can be determined sooner than in the comparative example.

Moreover, in the comparative example, the decision as to whether to adjust white balance is made based on the magnitude relationship of the absolute integration value differential $|I_R-I_G|$ and the adjustment initiation parameter P (Step S210 of FIG. 7). For this reason, there is a risk that, depending on the adjustment initiation parameter setting, white balance adjustment may not be performed in instances where it would be desirable to adjust the white balance. In contrast, in the first embodiment, since modification of the gain setting values $g_R$, $g_B$ (i.e. white balance adjustment) takes place when the green component integration value $I_{G0}$ lies outside the convergent range ($[I_{R-}, I_{R+}]$), it is possible to adjust white balance in a more reliable manner.

Furthermore, in the comparative example, since white balance convergence is determined through a comparison of the integration value differentials C, D for two frames, there is a risk that, depending on the conditions of the shot images it might not be possible to determine the attributes of white balance convergence in the event of a large change in images between frames, for example. In contrast, in the first embodiment, the decision as to whether to adjust white balance, i.e. as to whether white balance has converged, can be made based on a single frame. It is possible thereby to determine white balance convergence in a more reliable manner.

B. Second Embodiment

Figure 9:
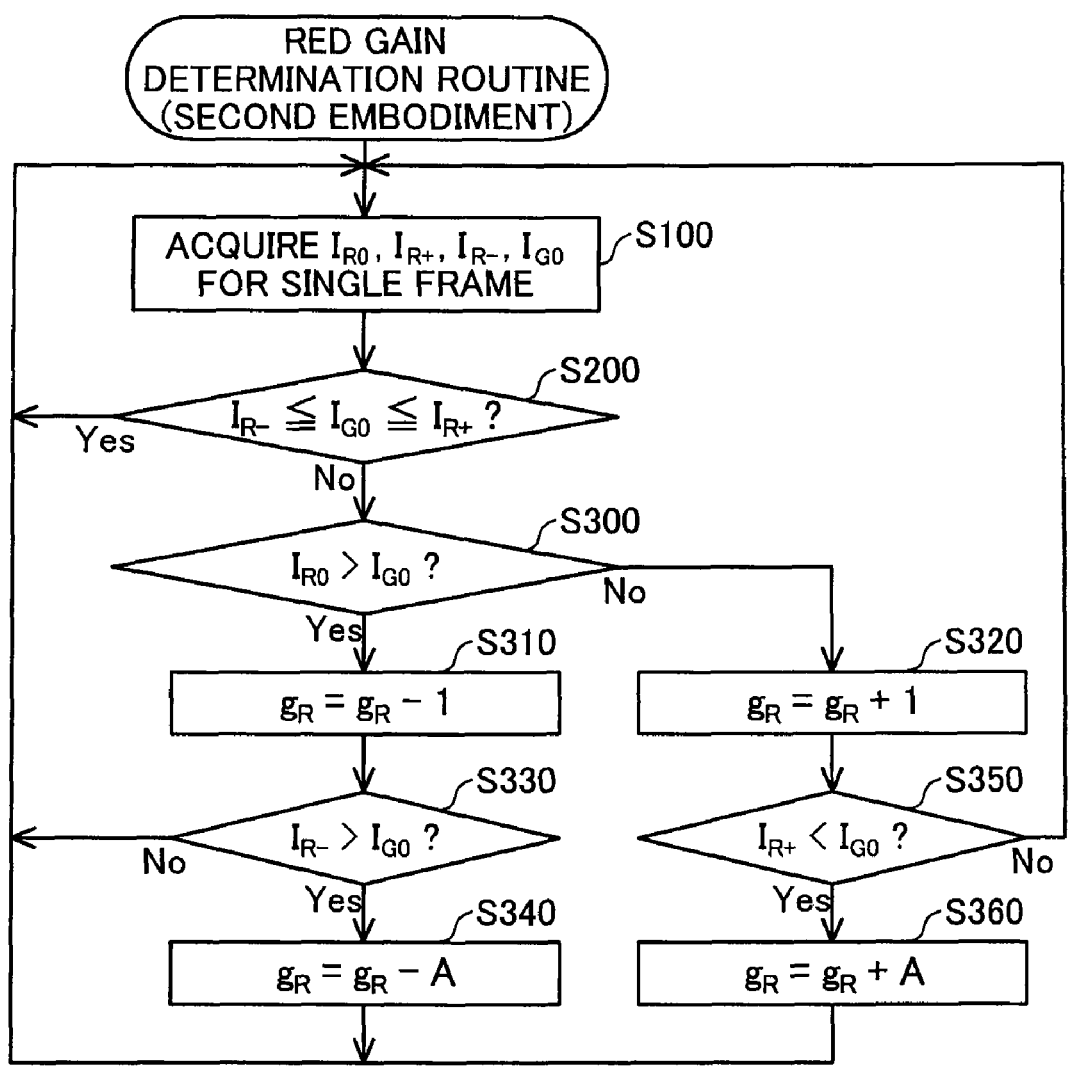
FIG. 9 is a flowchart showing a red gain determination routine in a second embodiment.

FIG. 9 is a flowchart showing a red gain determination routine in a second embodiment. The red gain determination routine of the second embodiment differs from the red gain determination routine of the first embodiment shown in FIG. 3 in that two additional Steps S330 and S340 follow Step S310, and two additional Steps S350 and S360 follow Step S320. Other respects are the same as the red gain determination routine of the first embodiment.

FIGS. 10A through 10E are illustrations depicting white balance adjustment taking place through execution of the red gain determination routine of FIG. 9. Each graph in FIGS. 10B through 10E shows change over time in the green component integration value $I_{G0}$ and the three kinds of red color component integration values $I_{R0}, I_{R+}, I_{R-}$. In FIGS. 10A through 10E, the horizontal axis represents time. FIG. 10A shows the frame numbers of the image data. In FIGS. 10B through 10E, the vertical axis represents the magnitude of the respective color component integration value. The broken lines in FIG. 10C through 10E show the green component integration value $I_{G0}$.

In Step S330, the auto white balance control unit 350 determines whether the negative deviation red component integration value $I_{R-}$ is greater than the green component integration value $I_{G0}$. In the event of a determination that the negative deviation red component integration value $I_{R-}$ is smaller than the green component integration value $I_{G0}$, control returns to Step S100. On the other hand, in the event of a determination that the negative deviation red component integration value $I_{R-}$ is greater than the green component integration value $I_{G0}$, control passes to Step S340. After subtracting deviation A from the red gain setting value $g_R$ in Step S340, control returns to Step S100. If the negative deviation red component integration value $I_{R-}$ is greater than the green component integration value $I_{G0}$, the undeviated red component integration value $I_{R0}$ becomes greater than the green component integration value $I_{G0}$ even if the red gain setting value $g_R$ is changed to negative deviation gain ($g_R$–A). For this reason, in Step S340, overadjustment of white balance does not occur despite subtraction of deviation A from the red gain setting value $g_R$. It can also be said that the offset value that is subtracted in Step S340 is established on the basis of the difference between positive deviation gain and negative deviation gain (2×A).

In Step S350, the auto white balance control unit 350 determines whether the positive deviation red component integration value $I_{R+}$ is smaller than the green component integration value $I_{G0}$. In the event of a determination that the positive deviation red component integration value $I_{R+}$ is smaller than the green component integration value $I_{G0}$, control passes to Step S360. After adding deviation A to the red gain setting value $g_R$ in Step S360, control returns to Step S100. On the other hand if the positive deviation red component integration value $I_{R+}$ is greater than the green component integration value $I_{G0}$, control returns to Step S100. It can also be said that the offset value that is added in Step S360 is established on the basis of the difference between positive deviation gain and negative deviation gain (2×A).

In the example of FIGS. 10A through 10E, in the first frame, the negative deviation red component integration value $I_{R-}$ is greater than the green component integration value $I_{G0}$. For this reason, the red gain setting value $g_R$ is decremented by 1 in Step S310, and deviation A (=1) is further subtracted in Step S340. Therefore, in the second frame, the red component integration values $I_{R0}$, $I_{R+}$, $I_{R-}$ each becomes even smaller than they are in the first embodiment. Nevertheless, the green component integration value $I_{G0}$ lies outside the convergence range, and both the undeviated red component integration value $I_{R0}$ and the negative deviation red component integration value $I_{R-}$ are greater than the green component integration value $I_{G0}$, red gain setting value $g_R$ is decremented by 1 and deviation A is subtracted.

Owing to this further reduction in the red gain setting value $g_R$, in the third frame interval (Frame #3) the green component integration value $I_{G0}$ now lies within the convergence range, and white balance has converged. By further subtracting deviation A from the red gain setting value $g_R$ in the event that the negative deviation red component integration value $I_{R-}$ is greater than the green component integration value $I_{G0}$ in this way, it is possible to achieve white balance convergence sooner. Similarly, by further adding deviation A to the red gain setting value $g_R$ in the event that the positive deviation red component integration value $I_{R+}$ is smaller than the green component integration value $I_{G0}$, it is possible to achieve white balance convergence sooner.

According to the second embodiment, by modifying the red gain setting value $g_R$ and the blue gain setting value $g_B$ on the basis of deviation A according to the magnitude relationship between the undeviated component integration values $I_{R0}$, $I_{G0}$, $I_{B0}$ and the positive deviation component integration values $I_{R+}$, $I_{B+}$ or the negative deviation component integration values $I_{R-}$, $I_{B-}$ in this way, white balance convergence can be achieved sooner than in the comparative example.

Moreover, the second embodiment is preferable to the first embodiment in terms of the ability to more quickly achieve white balance convergence. On the other hand, the first embodiment is preferable to the second embodiment in terms of affording a simpler white balance adjustment process.

C. Modifications

The invention is not limited to the embodiment discussed above, and may be reduced to practice in various other forms without departing from the spirit thereof, such as the following modifications, for example.

C1. Modification 1:

In the preceding embodiments, the white balance adjustment unit 300 includes a simplified interpolation process unit 310, and gain adjustment is performed on image data having undergone an interpolation process by the simplified interpolation process unit 310. It is also possible to omit the simplified interpolation process unit 310. For example, it is possible to use image data which has undergone an interpolation process by the interpolation process unit 230 of the camera controller 200 (FIG. 1). In this case, of the three gain adjusting units 322 through 326 of the white balance adjustment unit 300, it is possible to omit the undeviated gain adjustment unit 322. Also, gain adjustment equivalent to deviation A may be carried out by the positive deviation gain adjustment unit 324 and the negative deviation gain adjustment unit 326.

C2. Modification 2:

In the preceding embodiments, the auto white balance control unit 350 determines the red gain setting value $g_R$ on the basis of three kinds of red color component integration values $I_{R0}$, $I_{R+}$, $I_{R-}$. It is also possible to determine the red gain setting value $g_R$ on the basis of any two or more integration values among these red color component integration values $I_{R0}$, $I_{R+}$, $I_{R-}$. In this case, the offset value added to or subtracted from the red gain setting value $g_R$ may be modified appropriately depending on the integration values which are used.

C3. Modification 3:

In the preceding embodiments, the color component integrating units 342 through 346 (FIG. 2) integrate the color component values for pixels which the white detecting unit 330 has determined to be white. It is also possible to integrate the color component values for the entire image of a single frame, or to integrates the color component values for a portion of an image (e.g. the borders). However, by integrating the color component values for white pixels, it is possible to achieve better white balance adjustment irrespective of the condition of the subject, it is preferable to integrate the color component values for white pixels.

C4. Modification 4:

In the preceding embodiments, white balance adjustment is carried out through changing of respective gain of the red component R and the blue component B. It is also possible to accomplish white balance adjustment by some other method. For example, image data in the RGB color space could be converted to image data in the YCbCr color space, and white balance is adjusted through correction of the color difference components Cb, Cr. In this case as well, the color difference components Cb, Cr may be corrected with different correction parameters, and the necessity of white balance adjustment and the changing amount of correction parameter may be determined on the basis of the corrected color difference component integration values. Where the color difference components Cb, Cr are corrected, the benchmark value for the color difference component integration values will be set to zero.

C5. Modification 5:

In the preceding embodiments, the gain adjusting units 220 and 322 through 326 correct the color components of an image by multiplying gain by the color component values of the A/D-converted image data. It is also possible to correct the color components of an image by changing the level of amplification by the analog amplifier. In this case, an image sensor that outputs an analog image signal may be used as the image sensor.

C6. Modification 6:

While the preceding embodiments described implementation of the present invention in a video camera, besides video cameras, the invention could also be implemented in a digital still camera having a monitor function, or any of various other types of imaging devices. The present invention is applicable generally to devices that generate images sequentially in time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance adjustment device for adjusting white balance of an input image supplied sequentially in time, the white balance adjustment device comprising:
   a first target color component integrating unit that corrects a target color component from among a plurality of color components in a prescribed color space of a preceding input image based on a first value of a correction parameter, and integrates the corrected target color component for an integration target area constituting at least a part of the preceding input image to calculate a first target color component integration value;

a second target color component integrating unit that corrects the target color component of the preceding input image based on a second value different from the first value of the correction parameter, and integrates the corrected target color component for the integration target area to calculate a second target color component integration value;

a correction parameter determining unit that determines the first and second values to be used to correct the target color component of a subsequent input image by changing the first and second values according to magnitude relationship of the first and second target color component integration values to a benchmark value; and an adjusted image generating unit that generates an adjusted image of which white balance is adjusted through correction of the target color component of the subsequent input image based on a third value established between the first and second values determined by the correction parameter determining unit.

2. The white balance adjustment device according to claim 1 wherein if the benchmark value lies between the first target color component integration value and the second target color component integration value, the correction parameter determining unit does not change the first and second values, and if the benchmark value does not lie between the first target color component integration value and the second target color component integration value, the correction parameter determining unit changes the first and second values by performing addition or subtraction of a first offset value smaller than a differential between the first and second values to both of the first and second values used for correcting the target color component of the preceding input image according to magnitude relationship of the first and second target color component integration values to the benchmark value.

3. The white balance adjustment device according to claim 2 further comprising:

a third target color component integrating unit that corrects the target color component of the preceding input image based on the third value, and integrates the corrected target color component for the integration target area to calculate a third target color component integration value, wherein the correction parameter determining unit determines, on the basis of magnitude relationship of the third target color component integration value and the benchmark value, whether to add the first offset value to both of the first value and the second value, or to subtract the first offset value from both of the first value and the second value.

4. The white balance adjustment device according to claim 2 wherein the first and second target color component integration values monotonically increase as the correction parameter increases, the second value is set to a value greater than the first value, if the second target color component integration value is smaller than the benchmark value, the correction parameter determining unit further adds a second offset value established based on the differential of the first and second values respectively to the first and second values to which the first offset value has been added in advance, and if the second target color component integration value is greater than the benchmark value, the correction parameter determining unit further subtract the second offset value respectively from the first and second values from which the first offset value has been subtracted in advance.

5. The white balance adjustment device according to claim 1 wherein the benchmark value is a comparative color component integration value derived by integrating a comparative color component different from the target color component of the preceding input image for the integration target area.

6. The white balance adjustment device according to claim 1 wherein the input image supplied sequential in time is a moving image, the subsequent input image is an image of a current frame of which output from the white balance adjustment device is in progress, and the preceding input image is an image of a frame just previous to the current frame.

7. A white balance adjustment method for adjusting white balance of an input image supplied sequentially in time, the white balance adjustment method comprising the steps of:

(a) correcting a target color component from among a plurality of color components in a prescribed color space of a preceding input image based on a first value of a correction parameter, and integrating the corrected target color component for an integration target area constituting at least a part of the preceding input image to calculate a first target color component integration value;

(b) correcting the target color component of the preceding input image based on a second value different from the first value of the correction parameter, and integrating the corrected target color component for the integration target area to calculate a second target color component integration value;

(c) determining the first and second values to be used to correct the target color component of a subsequent input image by changing the first and second values according to magnitude relationship of the first and second target color component integration values to a benchmark value; and (d) generating an adjusted image of which white balance is adjusted through correction of the target color component of the subsequent input image based on a third value established between the first and second values determined by the step (c).

8. A video camera comprising:

an image capturing unit that captures an image sequentially in time;

a first target color component integrating unit that corrects a target color component from among a plurality of color components in a prescribed color space of a preceding captured image based on a first value of a correction parameter, and integrates the corrected target color component for an integration target area constituting at least a part of the preceding captured image to calculate a first target color component integration value;

a second target color component integrating unit that corrects the target color component of the preceding captured image based on a second value different from the first value of the correction parameter, and integrates the corrected target color component for the integration target area to calculate a second target color component integration value;

a correction parameter determining unit that determines the first and second values to be used to correct the target color component of a subsequent captured image by changing the first and second values according to magnitude relationship of the first and second target color component integration values to a benchmark value; and an adjusted image generating unit that generates an adjusted image of which white balance is adjusted through correction of the target color component of the subsequent captured image based on a third value established between the first and second values determined by the correction parameter determining unit.

* * * * *